(12) United States Patent
Zheng et al.

(10) Patent No.: US 11,910,157 B2
(45) Date of Patent: Feb. 20, 2024

(54) ELECTRONIC APPARATUS

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Yaobin Zheng, Guangzhou (CN); Yongyao Niu, Guangzhou (CN); Jiabin Yuan, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 174 days.

(21) Appl. No.: 17/696,843

(22) Filed: Mar. 16, 2022

(65) Prior Publication Data
US 2022/0210548 A1  Jun. 30, 2022

Related U.S. Application Data

(63) Continuation of application No. PCT/CN2020/099771, filed on Jul. 1, 2020.

(30) Foreign Application Priority Data

Sep. 20, 2019 (CN) .......................... 201910894078.5

(51) Int. Cl.
*H04R 1/32* (2006.01)
*H04R 1/02* (2006.01)

(52) U.S. Cl.
CPC ............... *H04R 1/323* (2013.01); *H04R 1/02* (2013.01)

(58) Field of Classification Search
CPC ........ H04R 1/323; H04R 1/02; H04R 1/2884; H04R 1/2896; H04R 2499/15
See application file for complete search history.

(56) References Cited

U.S. PATENT DOCUMENTS 5,524,062 A    6/1996  Oh
2005/0265570 A1  12/2005  Isotalo

FOREIGN PATENT DOCUMENTS

CN    201349323 Y    11/2009
CN    201398234 Y    2/2010
(Continued)

OTHER PUBLICATIONS

First Office action issued in related Japanese Application No. 2022 516013, dated Apr. 4, 2023, 5 pages.
(Continued)

*Primary Examiner* — David L Ton
(74) *Attorney, Agent, or Firm* — BAYES PLLC

(57) ABSTRACT

The present disclosure provides an electronic apparatus (1000, 2000, 4000), including a housing. One end of the housing is provided with an accommodating cavity (1200, 2100, 4100). A sound guide assembly is provided in the accommodating cavity. The sound guide assembly includes a sound box (1300, 2200, 4200) and a sound guide device (2300, 4300). The sound guide device includes a sound receiving portion (2310) and a sound guide body (2320). The sound receiving portion is connected with the sound box. The sound guide body is configured to lead out a sound. An end surface (2312) of the sound receiving portion includes a sound inlet (2311, 4311). A tail end of the sound guide body deviating from the sound receiving portion includes a sound outlet (2321, 4321). A vertical height of a (Continued)

tail end of the sound guide body is smaller than that of the sound receiving portion.

28 Claims, 12 Drawing Sheets

(56) References Cited

FOREIGN PATENT DOCUMENTS

| CN | 104113797 A | 10/2014 |
|---|---|---|
| CN | 204131695 U | 1/2015 |
| CN | 210839942 U | 6/2020 |
| CN | 211128078 U | 7/2020 |
| CN | 211128150 U | 7/2020 |
| EP | 0744880 A1 | 11/1996 |
| JP | H0284493 U | 6/1990 |
| JP | H0386676 U | 9/1991 |
| JP | H0847098 A | 2/1996 |
| KR | 19990010322 U | 3/1999 |
| KR | 20010083946 A | 9/2001 |
| KR | 20130112215 A | 10/2013 |

OTHER PUBLICATIONS

International Search Report issued in corresponding international application No. PCT/CN2020/099771, dated Sep. 23, 2020, 5 pages.
European Search Report issued in corresponding European application No. 20865102.6, dated Sep. 13, 2022, 6 pages.
Examination Report issued in corresponding Australian application No. AU2020350902A, dated Nov. 24, 2022, 3 pages.
Examination Report issued in corresponding Indian application No. 202217015824, dated Jan. 31, 2023, 5 pages.
Notice of Preliminary Rejection issued in corresponding Korean application No. 10-2022-7009356, dated May 30, 2023, 7 pages.

ELECTRONIC APPARATUS

CROSS-REFERENCE TO RELATED APPLICATION

The present application is a continuation of International Application No. PCT/CN2020/099771, filed on Jul. 1, 2020, which claims the benefit of priority to Chinese Patent Application No. 201910894078.5, filed on Sep. 20, 2019, both of which are incorporated herein by reference in their entireties.

TECHNICAL FIELD

The present disclosure relates to the technical field of sound boxes, and in particular to an electronic apparatus.

BACKGROUND

Sound boxes are sound producing components installed in many multimedia electronic apparatuses such as TVs, tablet computers, and touch-control integrative machines, which are important components related to user experience. A position of a sound outlet of a sound box directly affects the final sound quality of the sound box. In related technologies, the sound outlet of the sound box is generally arranged on the front of or under the electronic apparatus. If the sound outlet is arranged on an outer side surface of a side frame at a bottom portion of the multimedia electronic apparatus, sound waves will first be emitted to the ground and then reflected to human ears, thus the sound quality has been greatly affected. Therefore, most of the sound outlets are arranged on the front, which is used for display, of the multimedia electronic apparatus, so as to significantly improve the sound quality.

FIG. 1 is a schematic structure diagram of a sound box in an electronic apparatus in the related art. As shown in FIG. 1, an electronic apparatus 1000 may be, for example, a television, which includes a display screen and a housing assembly. A surface on which the display screen displays images is a display surface 1100, and the housing assembly includes a side frame surrounding the display screen and a rear shell behind the display screen. An accommodating cavity 1200 is formed between a bottom frame of the electronic apparatus 1000 and the rear shell. The sound box 1300 is arranged in the accommodating cavity 1200, and the sound output surface of the sound box is substantially aligned with the front of the electronic apparatus 1000, thereby realizing a sound production from the front of the electronic apparatus 1000.

However, with the above solution, due to the need to reserve enough installation space for the sound box 1300, the display region of the electronic apparatus 1000 needs to be occupied, or a very wide bottom frame needs to be reserved, which affects the overall modeling effect and takes up too much space.

SUMMARY

In order to overcome the above-mentioned shortcomings in the related art, the purpose of the embodiments of the present disclosure is to provide an electronic apparatus, and the embodiments of the present disclosure can enable the electronic apparatus to implement a narrow frame.

An embodiment of the present disclosure provides an electronic apparatus, including a housing. One end of the housing is provided with an accommodating cavity. A sound guide assembly is provided in the accommodating cavity. The sound guide assembly includes a sound box and a sound guide device. The sound guide device includes a sound receiving portion and a sound guide body. The sound receiving portion is connected with the sound box. The sound guide body is configured to lead out a sound. An end surface of the sound receiving portion is provided with a sound inlet. A tail end of the sound guide body deviating from the sound receiving portion is provided with a sound outlet. A bottom portion of the sound guide body is located on an installation datum plane. The sound receiving portion and the sound guide body are located on a same side of the installation datum plane. A bottom portion of the sound receiving portion is located on the installation datum plane or separated from the installation datum plane at a preset distance. A vertical height of the tail end of the sound guide body is smaller than that of the sound receiving portion.

In the electronic apparatus as mentioned above, optionally, a projection width of the sound inlet on the installation datum plane is smaller than that of the sound outlet on the installation datum plane.

In the electronic apparatus as mentioned above, optionally, the sound guide body includes a first part and a second part that are connected with each other. The first part is connected with the sound receiving portion, and the sound outlet is provided on a side of the second part deviating from the first part.

In the electronic apparatus as mentioned above, optionally, a vertical height of the first part on the installation datum plane gradually decreases from the sound inlet to the sound outlet. The vertical height of the first part on the installation datum plane is greater than or equal to that of the second part on the installation datum plane.

In the electronic apparatus as mentioned above, optionally, a projection width of a place where the first part is connected with the sound receiving portion on the installation datum plane is greater than that of a place where the first part is connected with the second part on the installation datum plane. A projection width of the first part on the installation datum plane is smaller than that of the second part on the installation datum plane.

In the electronic apparatus as mentioned above, optionally, the vertical height of the second part is equal across the installation datum plane. The projection width of the second part is equal across the installation datum plane.

In the electronic apparatus as mentioned above, optionally, the sound outlet is further provided with shock absorbing foam and a loudspeaker mesh. The shock absorbing foam surrounds an outer side wall of the sound outlet, and the loudspeaker mesh is arranged at a tail end of the sound outlet.

In the electronic apparatus as mentioned above, optionally, the electronic apparatus is further provided with an equalizer. The equalizer includes an equalizer sound inlet. The equalizer sound inlet is connected with the sound inlet. The equalizer is configured to evenly transmit a sound emitted by the sound box.

In the electronic apparatus as mentioned above, optionally, the equalizer sound inlet is provided with a plurality of sound guide plates. An interval between every two adjacent sound guide plates is equal. A gap between the two adjacent sound guide plates forms a sound input hole of the equalizer.

In the electronic apparatus as mentioned above, optionally, the equalizer is further provided with a plurality of die holes.

Another embodiment of the present disclosure provides an electronic apparatus, including a housing. One end of the housing is provided with an accommodating cavity. A sound guide assembly is provided in the accommodating cavity. The sound guide assembly includes a sound box and a sound guide device. The sound guide device is L-shaped and includes a sound input portion and a sound output portion. The sound input portion is connected with the sound box. The sound input portion is in communication with the sound output portion. A sound inlet of the sound input portion and a sound outlet of sound output portion are arranged side by side. A height of the sound input portion at the sound inlet is greater than that of the sound output portion at the sound outlet.

In the electronic apparatus as mentioned above, optionally, a height of the sound guide device is decreased along a direction from the sound inlet of the sound input portion towards the sound outlet of the sound output portion.

In the electronic apparatus as mentioned above, optionally, a height of the sound input portion is decreased along a direction from the sound inlet of the sound input portion towards the sound outlet of the sound output portion.

In the electronic apparatus as mentioned above, optionally, the sound output portion is in a flat shape.

In the electronic apparatus as mentioned above, optionally, a thickness of the sound output portion remains constant along a direction from the sound inlet of the sound input portion towards the sound outlet of the sound output portion.

In the electronic apparatus as mentioned above, optionally, the sound output portion is in a shape of a flat horn.

In the electronic apparatus as mentioned above, optionally, an angle between an upper surface of the sound input portion and an upper surface of the sound output portion is greater than or equal to ninety degrees.

In the electronic apparatus as mentioned above, optionally, the sound guide device is further provided with an equalizer. An equalizer sound inlet is in communication with the sound inlet of the sound input portion. An equalizer sound outlet is in communication with the sound outlet of the sound output portion.

In the electronic apparatus as mentioned above, optionally, the equalizer sound inlet includes at least two sound input holes arranged at intervals. At least one of the sound input holes is in communication with the sound inlet of the sound input portion. A first sound guide channel is formed between the at least one of the sound input holes and the equalizer sound outlet.

In the electronic apparatus as mentioned above, optionally, at least one of the sound input holes is a sound input slit arranged vertically.

In the electronic apparatus as mentioned above, optionally, the equalizer includes at least two sound guide structures. At least one of the sound input holes and the first sound guide channel are formed between adjacent sound guide structures.

In the electronic apparatus as mentioned above, optionally, at least one of the sound guide structures includes a first plate member and inclined partitions respectively arranged on both sides of the first plate member. The first plate member and the inclined partitions respectively arranged on both sides of the first plate form a triangle shape.

In the electronic apparatus as mentioned above, optionally, the first plate member and the inclined partitions respectively arranged on both sides of the first plate member surround and form a hollow triangular column with a die hole.

In the electronic apparatus as mentioned above, optionally, an angle between the two inclined partitions is an acute angle.

In the electronic apparatus as mentioned above, optionally, at least one of the sound input holes and the equalizer sound outlet are perpendicular to each other.

In the electronic apparatus as mentioned above, optionally, a height of a lower surface of the equalizer sound inlet is greater than that of a lower surface of the sound outlet of the sound output portion.

In the electronic apparatus as mentioned above, optionally, at least one of the sound input holes of the equalizer is formed between adjacent first plate members. The equalizer sound outlet is formed between an angle of the adjacent inclined partitions. A width of at least one of the sound input holes is smaller than that of the equalizer sound outlet.

In the electronic apparatus as mentioned above, optionally, the sound inlet of the sound input portion is parallel to the sound outlet of the sound output portion.

The electronic apparatus provided by the present disclosure includes a housing. One end of the housing is provided with an accommodating cavity. A sound guide assembly is provided in the accommodating cavity. The sound guide assembly includes a sound box and a sound guide device. The sound guide device includes a sound receiving portion and a sound guide body. The sound receiving portion is connected with the sound box. The sound guide body is a sound guide body leading out a sound. An end surface of the sound receiving portion is provided with a sound inlet. A tail end of the sound guide body deviating from the sound receiving portion is provided with a sound outlet. A bottom portion of the sound guide body is located on an installation datum plane. The sound receiving portion and the sound guide body are located on a same side of the installation datum plane. The bottom portion of the sound receiving portion is located on the installation datum plane or separated from the installation datum plane at a preset distance. A vertical height of a tail end of the sound guide body is smaller than that of the sound receiving portion. With the above arrangement, when the electronic apparatus of the present disclosure is in use, since the vertical height of the tail end of the sound guide body is smaller than that of the sound receiving portion, the side frame on a side of the sound outlet of the electronic apparatus can be made thin to achieve a narrow frame.

BRIEF DESCRIPTION OF THE DRAWINGS

In order to more clearly describe the technical solutions in the embodiments of the present disclosure or the related art, the drawings that need to be used in the description of the embodiments or the related art will be briefly introduced hereinafter. It goes without saying that the drawings in the following description are only some embodiments of the present disclosure. For those skilled in the art, without creative work, other drawings can also be obtained based on these drawings.

REFERENCE NUMERALS

1000—Electronic apparatus,
1100—Display surface,
1200—Accommodating cavity,
1300—Sound box,
2000—Electronic apparatus,
2100—Accommodating cavity,
2200—Sound box,
2210—Sound box housing,
2220—Loudspeaker,
2300—Sound guide device,
2310—Sound receiving portion,
2311—Sound inlet,
2312—End surface,
2313—Screw,
2320—Sound guide body,
2321—Sound outlet,
2322—First part,
2323—Second part,
2330—Shock absorbing foam,
2340—Loudspeaker mesh,
2350—Equalizer,
2351—Equalizer sound inlet,
2352—Equalizer sound outlet,
2353—Sound guide plate,
2354—Die hole,
2360—Front shell of sound guide device,
2370—Rear shell of sound guide device,
2371—Slot,
2372—Clamping hole,
2400—Sound box bracket,
2500—Backlight module,
2600—Display screen,
2700—Lower side frame,
3000—Installation datum plane,
4000—Electronic apparatus,
4100—Accommodating cavity,
4200—Sound box,
4221—Sound box housing,
4222—Loudspeaker,
4300—Sound guide device,
4310—Sound input portion,
4311—Sound inlet,
4320—Sound output portion,
4321—Sound outlet,
4330—Equalizer,
4331—Equalizer sound inlet,
43310—Sound input hole,
4332—Equalizer sound outlet,
4333—Sound guide structure,
43331—First plate member,
43332—Inclined partition,
4334—Die hole,
4400—sound box bracket,
4500—Backlight module,
4600—Display screen,
4700—Lower side frame.

DETAILED DESCRIPTION

In order to make the purpose, technical solutions and advantages of the embodiments of the present disclosure clearer, the technical solutions in the embodiments of the present disclosure will be described clearly and completely in conjunction with the accompanying drawings in the embodiments of the present hereinafter. It goes without saying that the described embodiments are only some embodiments of the present disclosure, not all embodiments. Based on the embodiments of the present disclosure, all other embodiments obtained by those skilled in the art without creative work shall fall within the claimed scope of the present disclosure. Absent conflicts, the following embodiments and features in the embodiments can be combined with each other.

Sound boxes are sound producing components installed in many multimedia electronic apparatuses such as TVs, tablet computers, and touch-control integrative machines, which are important components related to user experience. Generally, the front of the electronic apparatus facing the user is mainly the display region. If the sound outlet of the sound box is arranged on the front of the electronic apparatus, the width of the side frame needs to be appropriately increased. At this time, if the area of the display region wants to be maintained, it will cause increase in the volume of the entire apparatus. If the volume of the entire apparatus is not increased, a part of the area of the display region will be occupied. In the related art, there has not been a solution that can achieve frontal sound production without increasing the width of the side frame or occupying the area of the display region.

Figure 1:
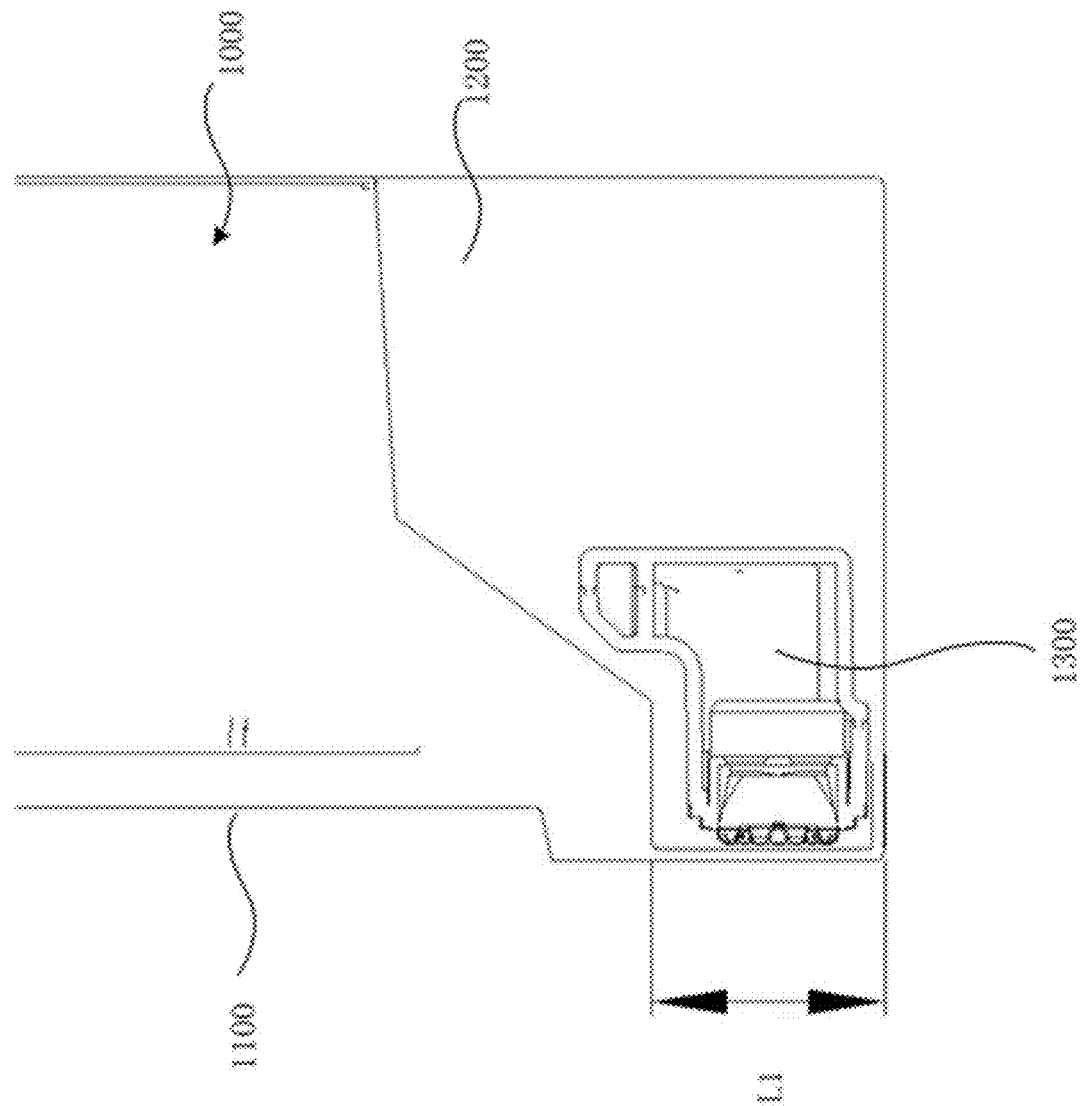
FIG. 1 is a schematic structure diagram of a sound box in an electronic apparatus in the related art.
Figure 2:
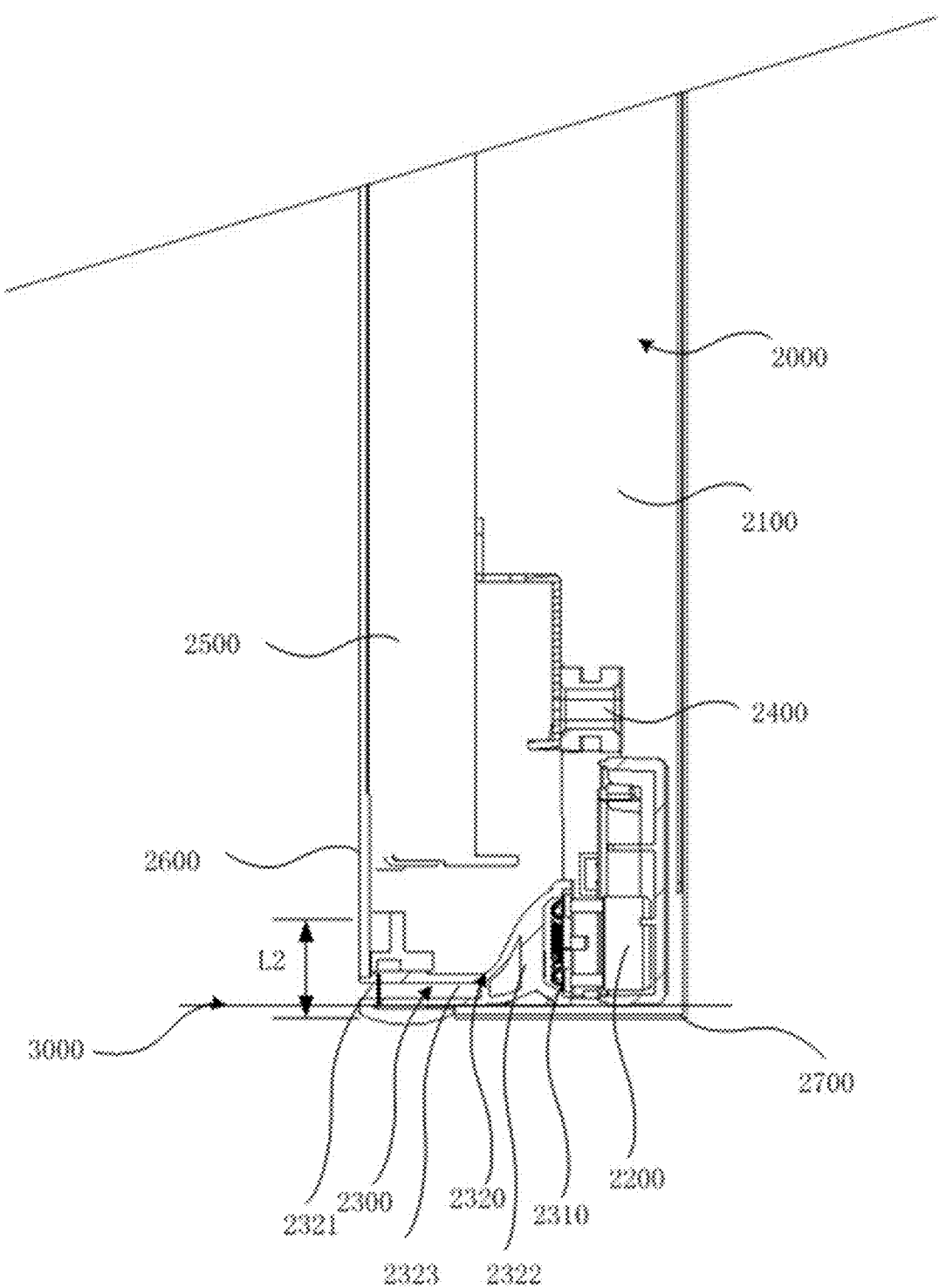
FIG. 2 is a schematic structure diagram of a sound box in an electronic apparatus provided by an embodiment of the present disclosure.
Figure 3:
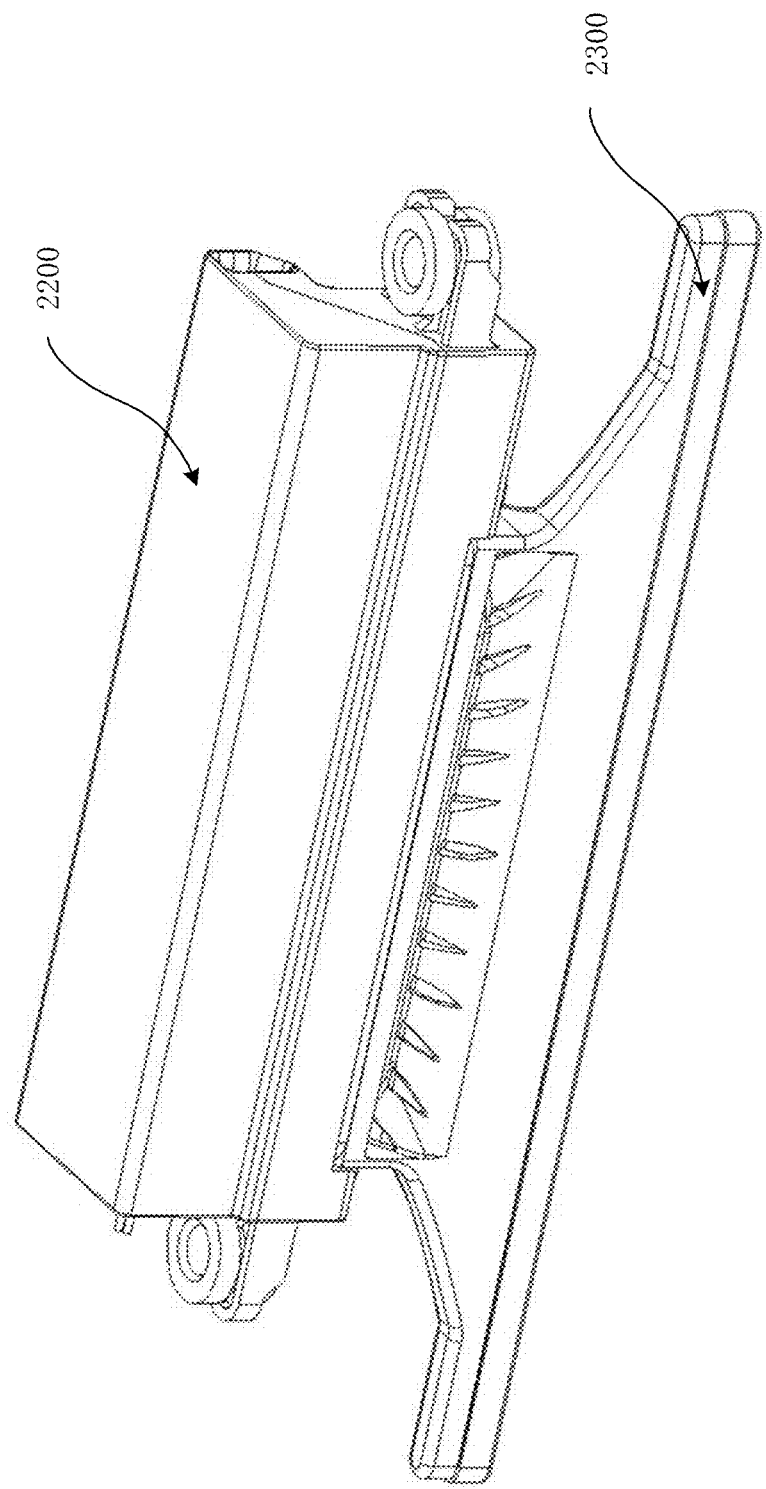
FIG. 3 is a schematic structure diagram of a sound guide assembly from a first perspective provided by an embodiment of the present disclosure.
Figure 4:
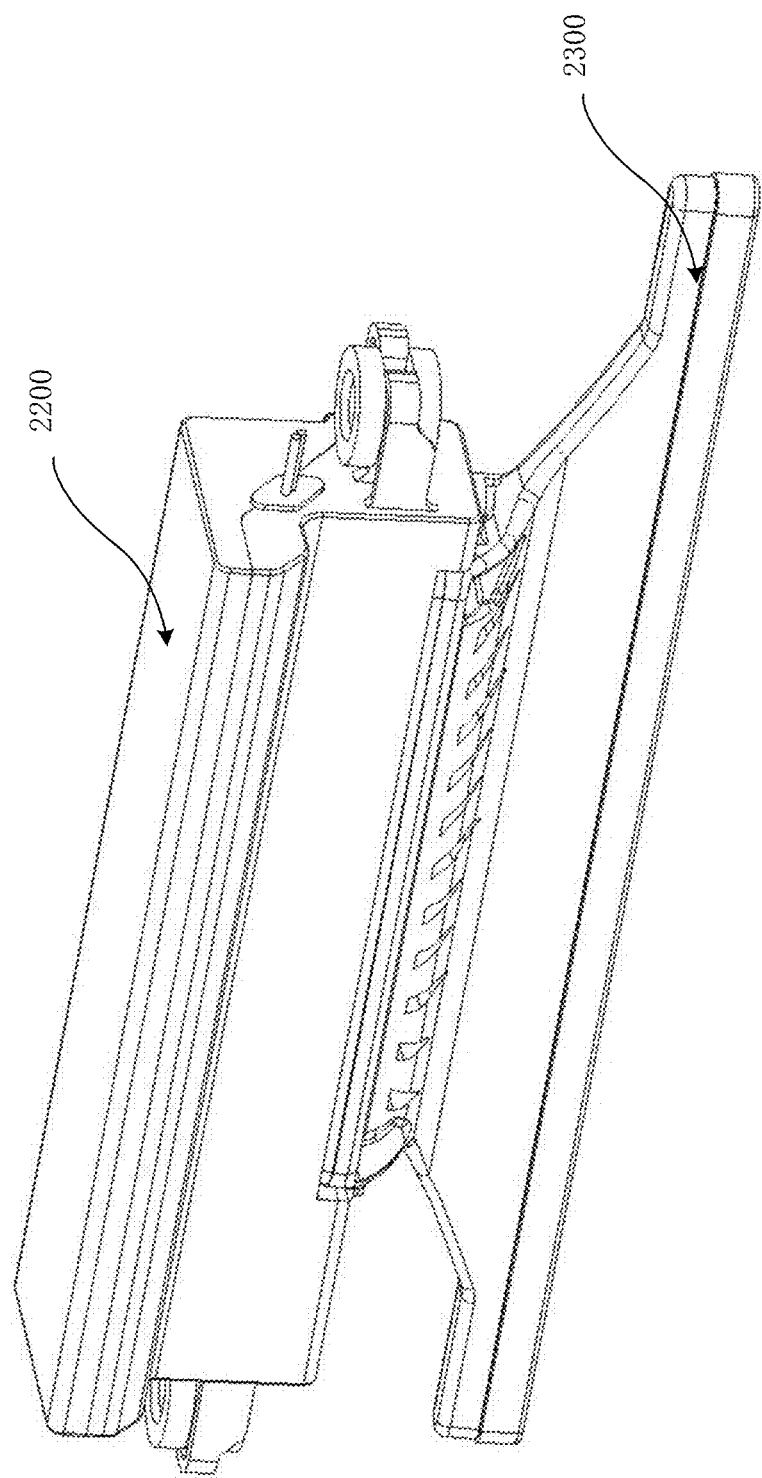
FIG. 4 is a schematic structure diagram of a sound guide assembly from a second perspective provided by an embodiment of the present disclosure.
Figure 5:
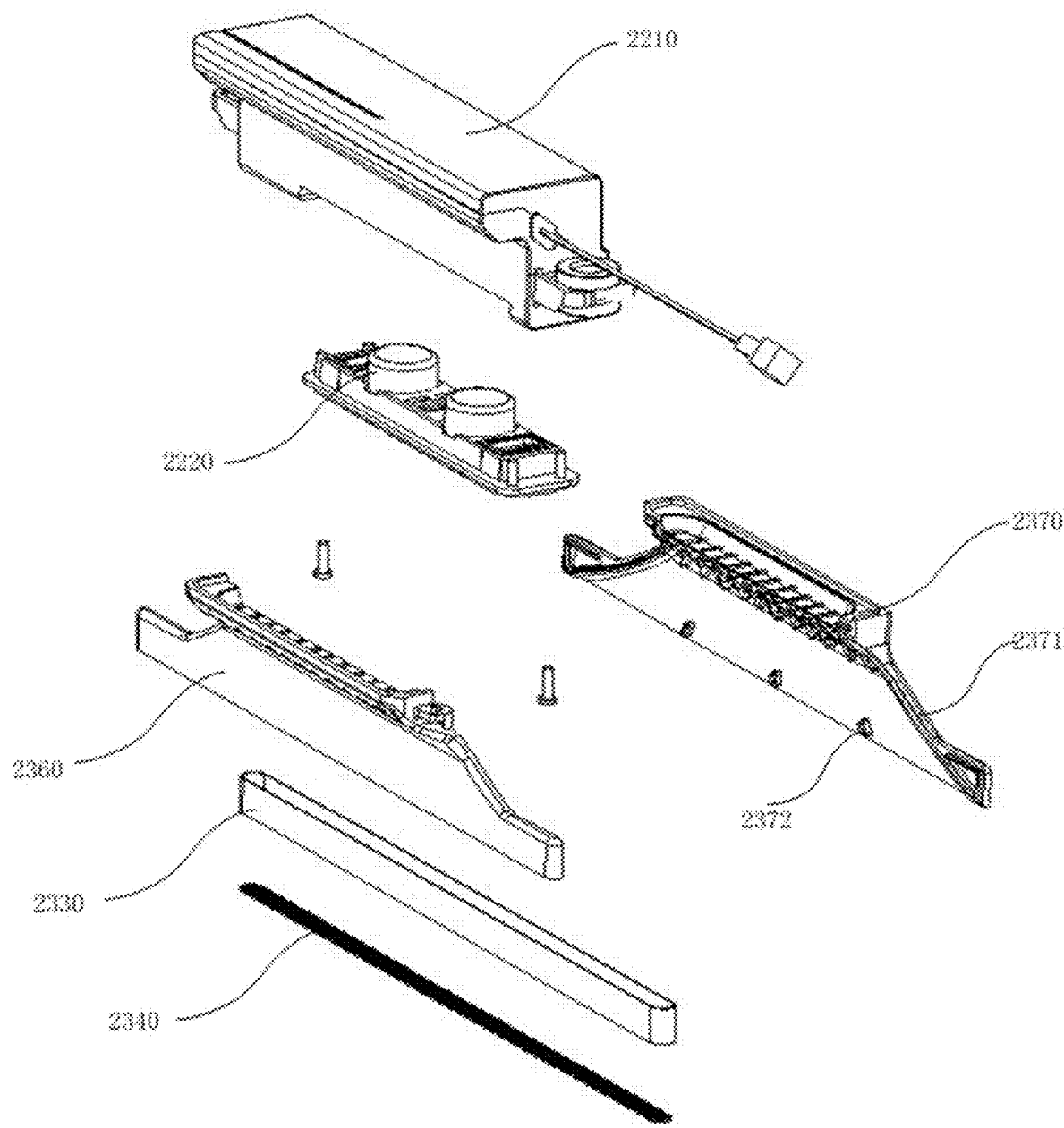
FIG. 5 is an exploded view of a sound guide assembly provided by an embodiment of the present disclosure.
Figure 6:
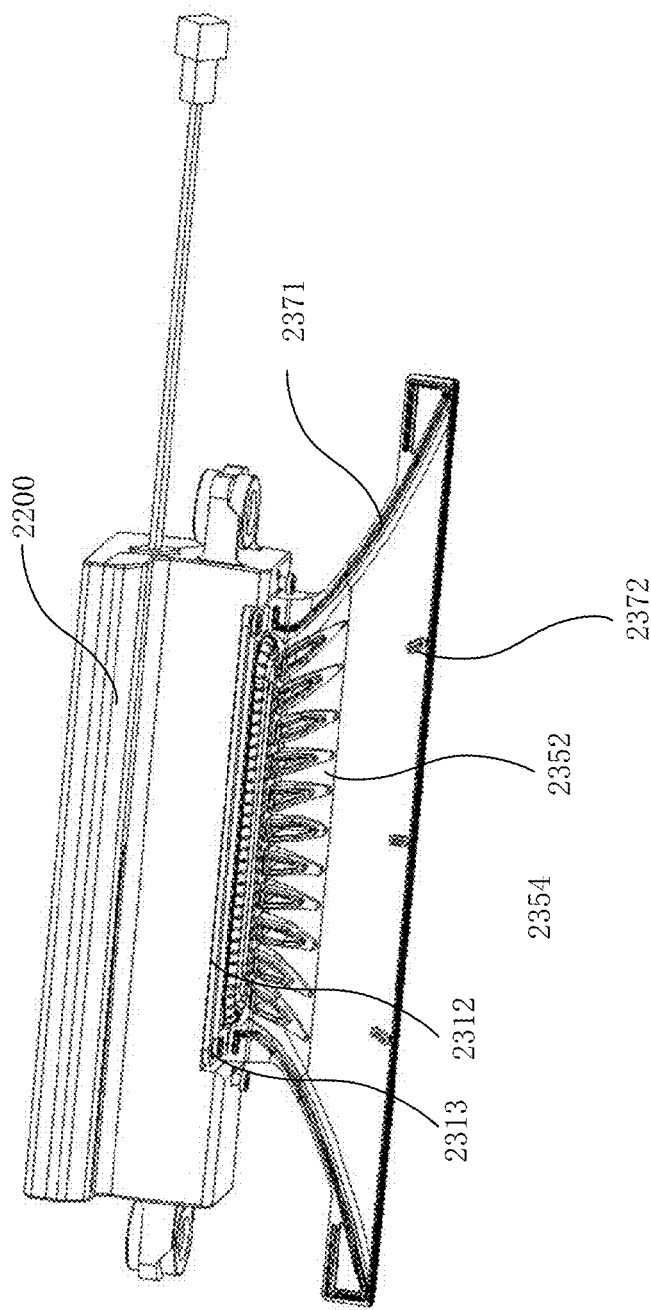
FIG. 6 is a schematic structure diagram of a sound guide assembly after removing a front shell of the sound guide device provided by an embodiment of the present disclosure.
Figure 7:
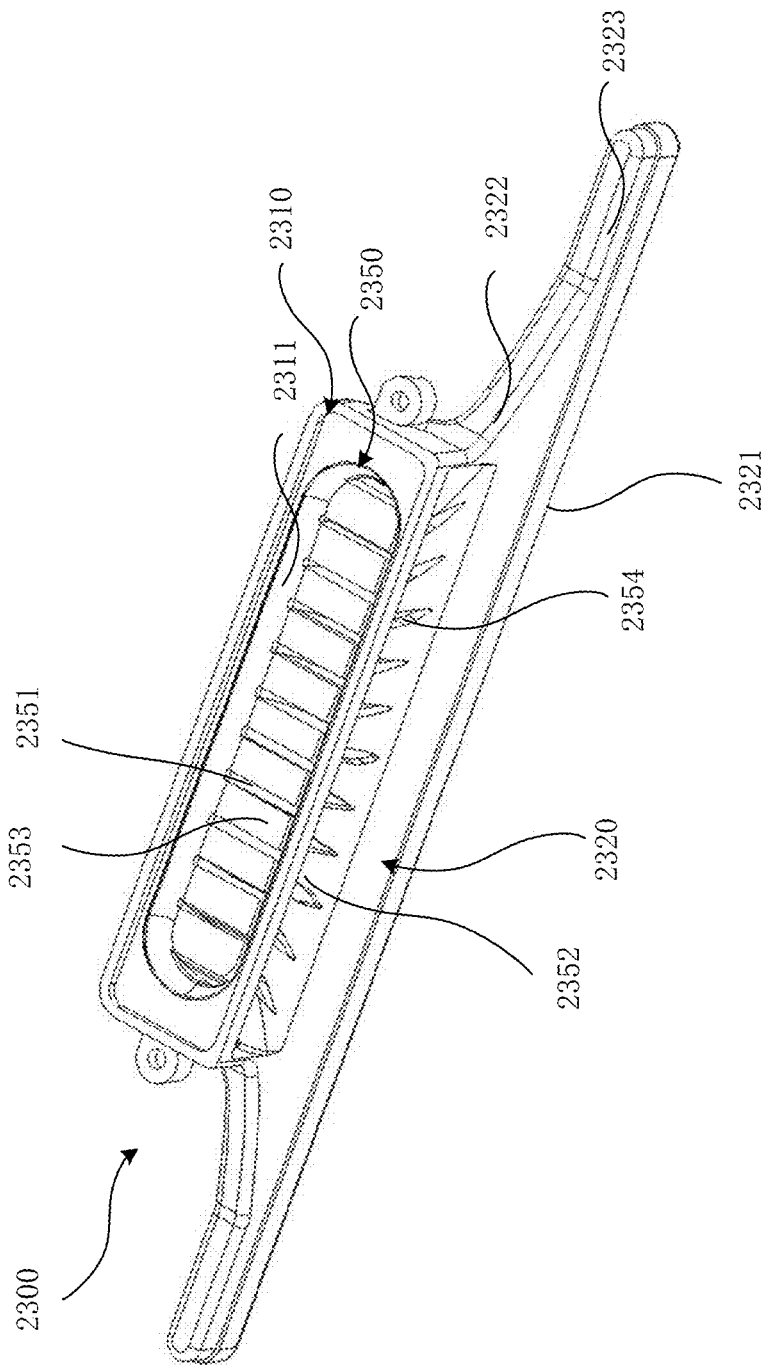
FIG. 7 is a schematic structure diagram of a sound guide device provided by an embodiment of the present disclosure.

In order to solve the above-mentioned problems, the present disclosure provides a sound guide device, a sound guide assembly, and an electronic apparatus having the sound guide assembly. Thereinto, FIG. 2 is a schematic structure diagram of a sound box in an electronic apparatus provided by an embodiment of the present disclosure. FIG. 3 is a schematic structure diagram of a sound guide assembly from a first perspective provided by an embodiment of the present disclosure. FIG. 4 is a schematic structure diagram of a sound guide assembly from a second perspective provided by an embodiment of the present disclosure. FIG. 5 is an exploded view of a sound guide assembly provided by an embodiment of the present disclosure. FIG. 6 is a schematic structure diagram of a sound guide assembly after removing a front shell of the sound guide device provided by an embodiment of the present disclosure. FIG. 7 is a schematic structure diagram of a sound guide device provided by an embodiment of the present disclosure.

First, the names involved in the present disclosure are described as follows.

"Installation datum plane" refers to a reference plane, which can be used as a datum plane when the electronic apparatus is installed, and the reference plane is perpendicular to the display surface of the electronic apparatus. For example, when the electronic apparatus needs to be installed vertically, the installation datum plane is a horizontal plane, the bottom portion of the entire electronic apparatus after installation is just tangent to the horizontal plane, the display surface is arranged upright, and the display surface is perpendicular to the installation datum plane. "Vertical" refers to the direction perpendicular to the installation datum plane. Due to the above-mentioned definition of the relationship between the display surface and the datum plane, it is possible to determine that the display surface extends in the vertical direction.

As shown in FIG. 2, an implementation approach of this embodiment provides an electronic apparatus 2000, including a display assembly, a housing, a main board arranged in the housing, and various accessories (such as a sound box, a display indicator, various interfaces, etc.). The display assembly includes a backlight module 2500 and a display screen 2600. The backlight module 2500 is arranged on the front of the housing. An accommodating cavity 2100 is formed between the backlight module 2500 and the back surface of the housing. The accommodating cavity 2100 is provided with a sound box bracket 2400 and a sound guide assembly. The sound guide assembly includes a sound box 2200 and a sound guide device 2300. The sound box 2200 is arranged on a side of the accommodating cavity 2100 close to the lower side frame 2700 of the housing. The sound box 2200 is fixedly arranged on the sound box bracket 2400, and optionally, the sound box 2200 can be fixed by means of hoisting combined with bolt connection or clamping. For example, a slot for fixing the sound box 2200 may be provided on the sound box bracket 2400, and an upper end of the sound box 2200 is fixed in the slot through a clamping portion.

The sound guide device 2300 includes a sound receiving portion 2310 and a sound guide body 2320. The sound receiving portion 2310 is connected with the sound box 2200. The sound guide body 2320 is configured as a sound guide body 2320 that leads out the sound. An end surface of the sound receiving portion 2310 is provided with a sound inlet 2311, and the tail end of the sound guide body 2320 deviating from the sound receiving portion 2310 is provided with a sound outlet 2321. A bottom portion of the sound guide body 2320 is located on an installation datum plane 3000, and the sound receiving portion 2310 and the sound guide body 2320 are located on the same side of the installation datum plane 3000, and the bottom portion of the sound receiving portion 2310 is located on the installation datum plane 3000 or separated from the installation datum plane 3000 at a preset distance. The vertical height of the tail end of the sound guide body 2320 is smaller than that of the sound receiving portion 2310.

Thereinto, the vertical height refers to a height in a direction perpendicular to the installation datum plane 3000.

Optionally, the sound box 2200 may specifically include a sound box housing 2210 and a loudspeaker 2220 arranged at the lower portion of the sound box housing 2210, and the sound is transmitted from the loudspeaker 2220. The structure of the sound receiving portion 2310 can be matched with a side of the sound box housing 2210 provided with the loudspeaker 2220. Optionally, the sound receiving portion 2310 may be formed at a starting end of the sound guide body 2320, and has an end surface 2312 that matches with a side surface, provided with the loudspeaker 2220, of the sound box housing 2210, and the sound inlet 2311 is provided on the end surface 2312. The sound receiving portion 2310 abuts against the surface of the sound box housing 2210 through the end surface 2312 and makes the sound inlet 2311 align with the loudspeaker 2220, and the sound receiving portion 2310 and the sound box housing 2210 can be connected together by screws 2313 or buckles. A sound cavity is formed in the sound guide body 2320, and the sound cavity is in communication with the sound inlet 2311, so that all sound output by the loudspeaker 2220 can be transmitted to the sound outlet through the sound inlet 2311.

The end surface of the sound receiving portion 2310 is provided with a sound inlet 2311. The tail end of the sound guide body 2320 deviating from the sound receiving portion 2310 is provided with a sound outlet 2321. One end of the sound cavity in the sound guide body 2320 is in communication with the sound inlet 2311, and the other end is in communication with the sound outlet. Thus, the sound emitted by the loudspeaker 2220 is led out to the sound outlet through the sound cavity in the sound guide body 2320 and then output.

The sound receiving portion 2310 and the sound guide body 2320 are both located on the same side of the installation datum plane 3000. In this embodiment, the installation datum plane 3000 is a horizontal plane shown in FIG. 2, wherein the bottom portion of the sound receiving portion 2310 can be located on the installation datum plane 3000 (that is, the point, line or surface of the sound receiving portion at the bottom portion is located on the installation datum plane), or separated from the installation datum plane 3000 at a preset distance. The bottom portion of the sound guide body 2320 can be located on the installation datum plane 3000 (that is, the point, line or surface of the sound guide body at the bottom portion is located on the installation datum plane). The end surface of the sound receiving portion 2310 connecting the sound box 2200 and the tail end surface of the sound guide body 2320 (that is, an end of the sound guide deviating from the sound receiving portion) can be parallel or have a certain angle, so that the sound inlet 2311 and the sound outlet are parallel or have the above-mentioned certain angle, which is not limited in this embodiment. In addition, in this embodiment, the vertical height of the tail end of the sound guide body 2320 is smaller than that of the sound receiving portion 2310. In other words, according to the previous definition of "vertical", it means that in the direction perpendicular to the reference plane 3000, the height of the tail end of the sound guide body provided with the sound outlet is smaller than that of the sound receiving portion provided with the sound inlet 2311. And the height herein is the maximum vertical dimension of the outer contour of the tail end of the sound guide body and the vertical maximum dimension of the outer contour of the sound receiving portion.

It should be noted that the specific shape of the sound guide body 2320 is related to the positions of the sound receiving portion 2310 and the sound outlet 2321, while the relative positions of the internal components of the electronic apparatus are fully considered to optimize the layout. However, no matter how the layout is further optimized, by setting the vertical space occupied by the tail end of the sound guide body 2320 provided with the sound inlet to be smaller than that occupied by the sound receiving portion, it is possible to allow the sound outlet to be arranged on the front of the side frame which is on the same side with the display surface, thereby ensuring better sound quality. At the same time, since the vertical space is very small, it can fully meet the design requirements of the narrow frame, so that under the premise that the display region of the electronic apparatus is not affected, the overall space of the electronic apparatus is smaller, and it is more convenient for users to install and use.

When the layout of the sound guide device 2300 of the electronic apparatus provided in this embodiment is adopted, the sound box 2200 can be arranged in the space enclosed by the rear side of the display screen 2600 and the housing, or the space at the bottom portion of the display screen 2600 close to the rear housing. These positions have a relatively large space which is not occupied by other components, and will not increase the overall volume of the electronic apparatus. Moreover, the sound guide device 2300 of this embodiment is used to transmit the sound of the sound box 2200 to the front where the display surface is located, which ensures the sound quality effect, and overcomes the difficult problems of simultaneously balancing layout, sound quality effect and narrow frame design. The specific height of the front side frame of the electronic apparatus 2000 is limited by the height of the sound outlet 2321. Preferably, the electronic apparatus using the sound guide device 2300 of this embodiment can cause the height of the side frame to be 1.5 to 5 mm while ensuring volume and quality of the sound emitted from the front, thereby achieving a visually ultra-thin frame.

Since the sound guide device 2300 is added to the electronic apparatus, the sound conduction effect of the sound guide device 2300 can also enhance the sound wave emitted by the sound box 2200, thereby increasing the propagation distance of the sound wave.

In an optional implementation approach, a projection width of the sound inlet 2311 on the installation datum plane 3000 is smaller than that of the sound outlet 2321 on the installation datum plane 3000, wherein the projection width refers to a length in a direction vertical to the paper surface in FIG. 2.

By the above arrangement, the sound wave can gradually propagate from a narrow space to a wider space in the sound guide device 2300, thereby improving the propagation range of the sound wave and the directivity of sound propagation.

Optionally, the sound guide body 2320 in this embodiment includes a first part 2322 and a second part 2323 that are connected with each other, the first part 2322 is connected with the sound receiving portion 2310, and the sound outlet 2321 is provided on a side of the second part 2323 deviating from the first part 2322.

Thereinto, a vertical height of the first part 2322 on the installation datum plane 3000 gradually decreases from the sound inlet 2311 to the sound outlet 2321, and the vertical height of the first part 2322 on the installation datum plane 3000 is greater than or equal to that of the second part 2323 on the installation datum plane 3000.

The projection width of the first part 2322 on the installation datum plane 3000 gradually increases from the sound inlet 2311 to the sound outlet 2321, and the projection width of the first part 2322 on the installation datum plane 3000 is smaller than that of the second part 2323 on the installation datum plane 3000.

By setting the first part 2322 to a structure with a gradually decreasing vertical height, the sound waves can be compressed in the vertical direction. And setting the first part 2322 to a structure with a gradually increasing width can make the inner surface of the first part 2322 realize a smooth transition and avoids dead angles, thereby facilitating the transmission of sound waves in the sound guide body 2320 and reducing the volume loss during propagation.

Optionally, in this embodiment, a vertical height of the second part 2323 is equal across the installation datum plane 3000. Optionally, the vertical height of the second part 2323 on the installation datum plane 3000 changes gradually along a certain direction, and the specific situation may depend on the project implementation. A projection width of the second part 2323 is equal, or approximately equal across the installation datum plane 3000, or gradually changes towards a certain direction, and the specific situation can be determined by the project implementation.

Optionally, arranging the second part 2323 into the above-mentioned generally rectangular parallelepiped structure can facilitate the processing of the accommodating cavity 2100 of the electronic apparatus, which reduces the processing difficulty, improves the production efficiency, and also facilitates its installation on the electronic apparatus.

In this embodiment, an outer edge of the sound outlet 2321 is further provided with shock absorbing foam 2330 and the outlet of the sound outlet 2321 is provided with a loudspeaker mesh 2340. Thereinto, the shock absorbing foam 2330 surrounds an outer wall of the sound outlet 2321, which can be specifically bonded to the outer wall of the sound outlet 2321 by bonding means and other means, so as to reduce the vibration between the loudspeaker 2220 and the electronic apparatus, and the loudspeaker mesh 2340 is arranged at the tail end of the sound outlet 2321. Through the above arrangement, the effects of shock absorption and sound lead-out can be achieved.

Optionally, the sound guide device 2300 of this embodiment further includes an equalizer 2350. The equalizer 2350 includes an equalizer sound inlet 2351 connected with the sound inlet 2311, and the equalizer 2350 is configured to transmit the sound emitted by the sound box 2200 evenly.

That is, the equalizer sound inlet 2351 is in communication with the sound inlet 2311 of the sound receiving portion 2310, and the equalizer sound outlet 2352 is in communication with the sound outlet 2321 of the sound guide body 2320. Thereinto, the equalizer sound inlet 2351 and the equalizer sound outlet 2352 may have a certain angle, for example, ninety degrees. That is, in this embodiment, the sound emitted from the sound box 2200 can be compressed in the vertical direction and spread in the horizontal direction through the equalizer 2350. The equalizer 2350 may be arranged on a side of the sound guide body 2320 close to the sound receiving portion 2310, and may be arranged in the first part 2322 of the sound guide body 2320.

The equalizer sound inlet 2351 is provided with a plurality of sound guide plates 2353, and an interval between every two adjacent sound guide plates 2353 is equal, and a gap between the two adjacent sound guide plates 2353 forms sound input holes of the equalizer. By arranging the evenly distributed sound guide plates 2353, the sound waves at various frequencies can be uniformly distributed in the equalizer 2350, so that the sound waves enter the sound guide body 2320 evenly, and the consistency of the volume in the sound guide body 2320 can be achieved.

In this embodiment, the equalizer 2350 and the first part 2322 can be formed by integral injection molding. The equalizer 2350 is further provided with a plurality of die holes 2354, so as to facilitate the implementation of the molding process. An equalizer sound outlet 2352 is formed between two adjacent die holes 2354.

Optionally, FIG. 5 is an exploded view of a sound guide assembly provided by an embodiment of the present disclosure. With reference to FIG. 5, in an optional embodiment, the sound guide device 2300 of this embodiment can be composed of two parts. The sound guide device 2300 includes a front shell 2360 of the sound guide device and a rear shell 2370 of the sound guide device. The sound guide plate 2353 can be arranged on either one of the front shell 2360 and the rear shell 2370 of the sound guide device. In this embodiment, the sound guide plate 2353 may be provided on the rear shell 2370 of the sound guide device. The front shell 2360 and the rear shell 2370 of the sound guide device are connected and fixed by a clamping connection, thereby facilitating installation and disassembly.

Optionally, the front shell 2360 and the rear shell 2370 of the sound guide device in this embodiment are provided with a matching clamping portion. The clamping portion specifically includes a slot 2371 arranged at the edge of the rear shell 2370 of the sound guide device and extending along the rear shell 2370 of the sound guide device. The clamping portion further includes a clamping hole 2372 provided on the rear shell 2370 of the sound guide device. The clamping structure matching with the above-mentioned slot 2371 and the clamping hole 2372 is provided on the front shell 2360 of the sound guide device, thus it can realize the fixed connection between the front shell 2360 and the rear shell 2370 of the sound guide device by clamping.

Figure 8:
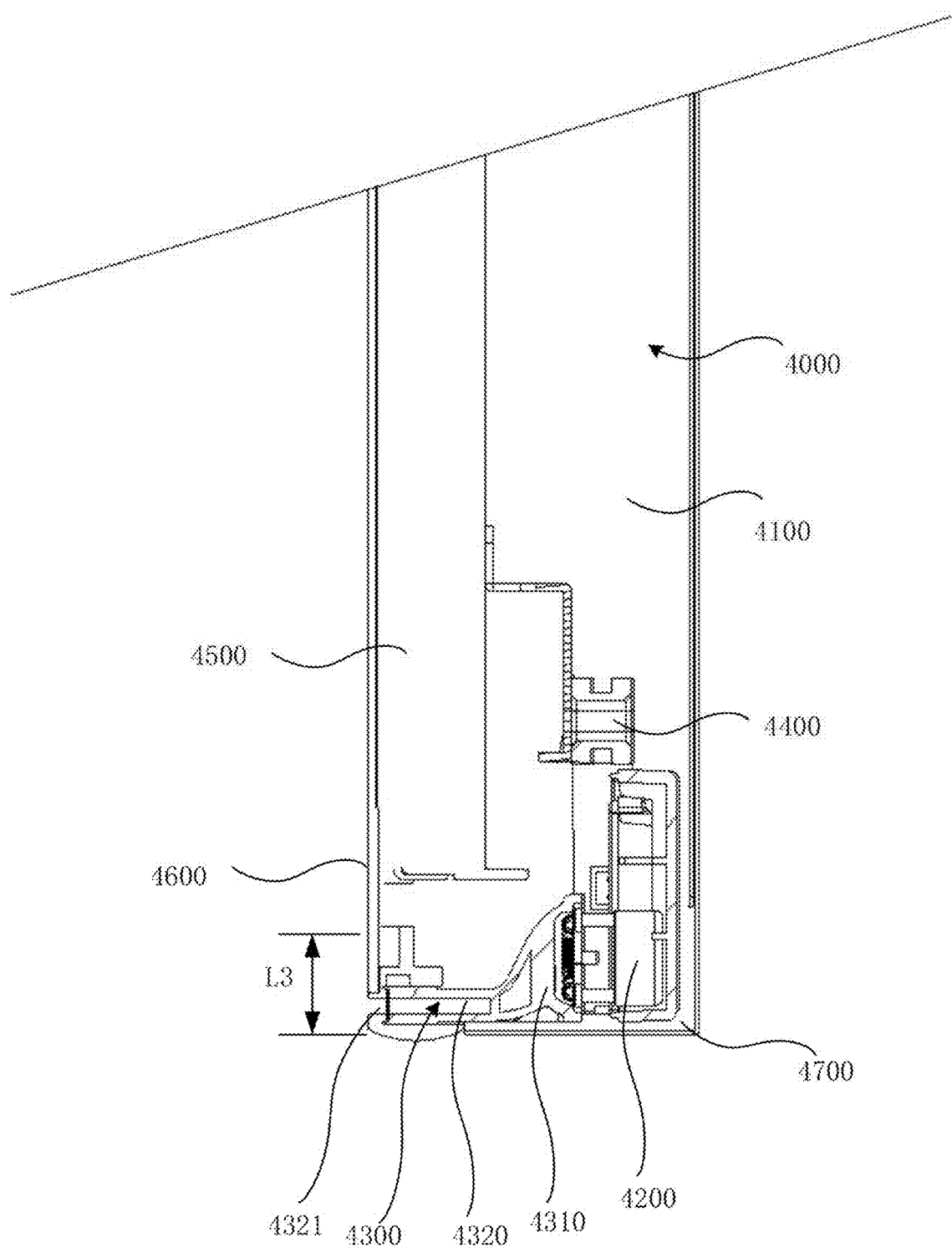
FIG. 8 is a schematic structure diagram of a sound box in an electronic apparatus provided by another embodiment of the present disclosure.
Figure 9:
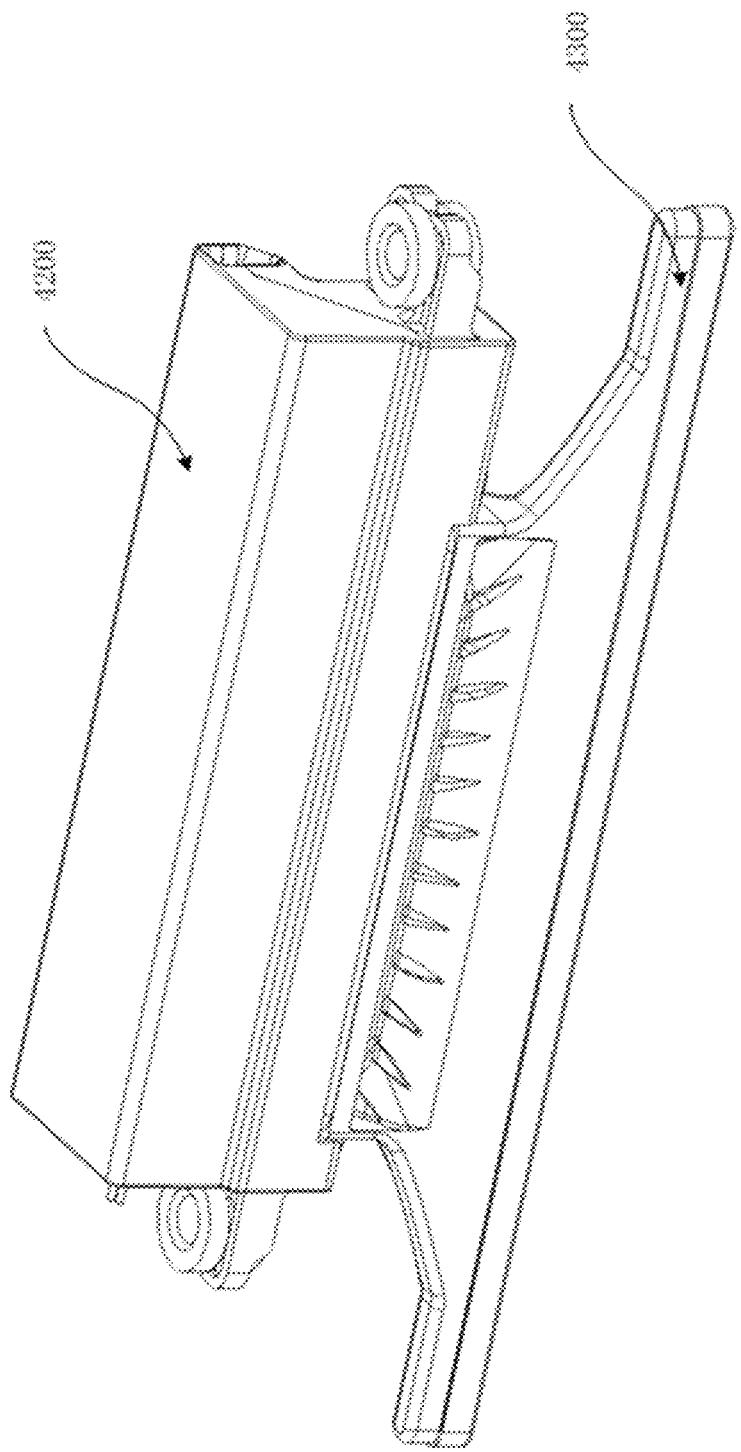
FIG. 9 is a schematic structure diagram of a sound guide assembly from a first perspective provided by another embodiment of the present disclosure.
Figure 10:
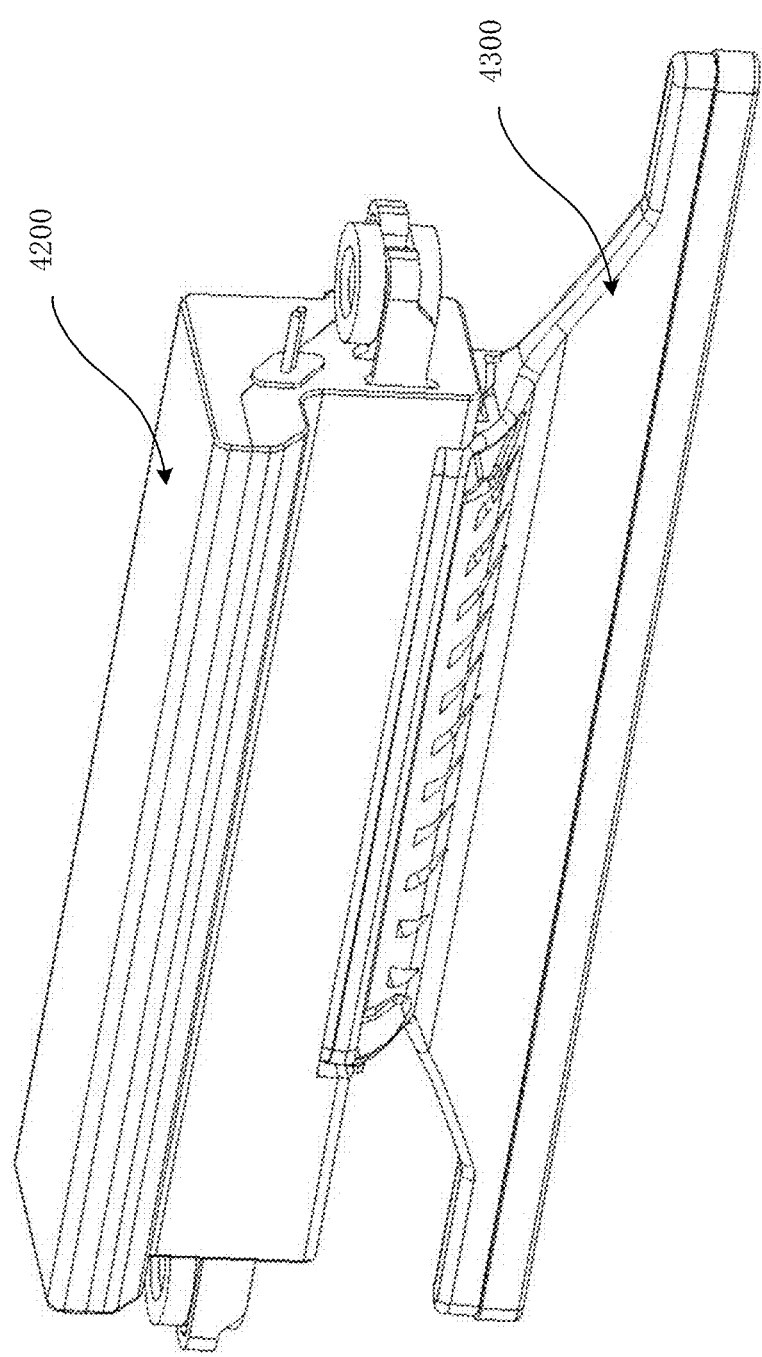
FIG. 10 is a schematic structure diagram of a sound guide assembly from a second perspective provided by another embodiment of the present disclosure.
Figure 11:
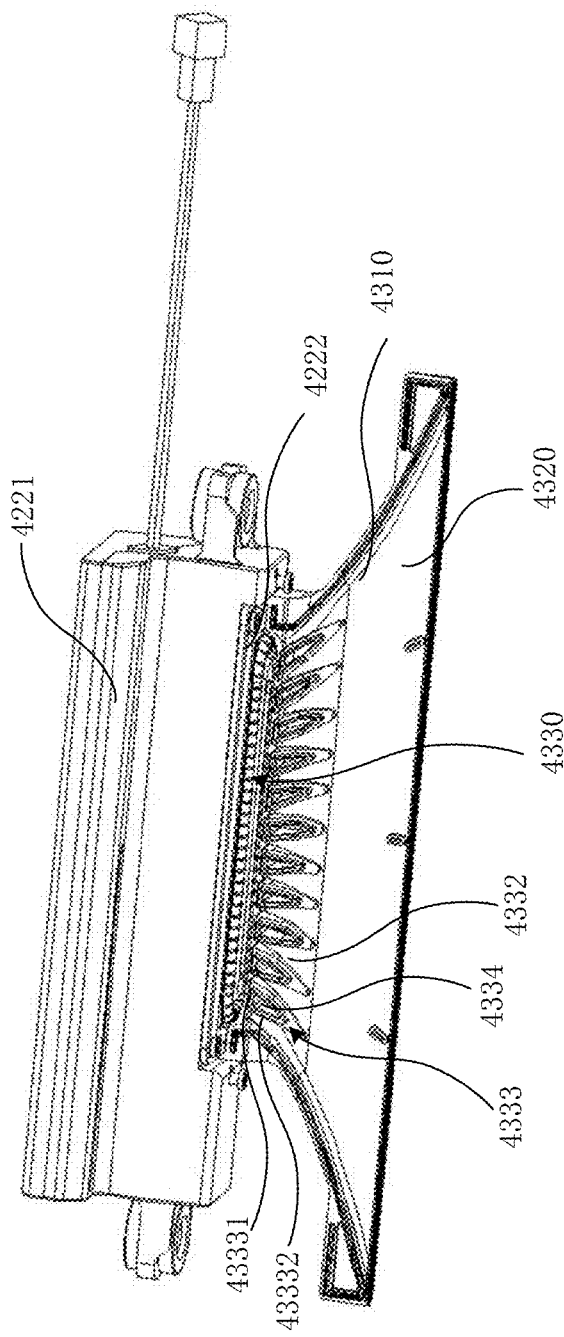
FIG. 11 is a schematic diagram of an internal structure of a sound guide assembly provided by another embodiment of the present disclosure.
Figure 12:
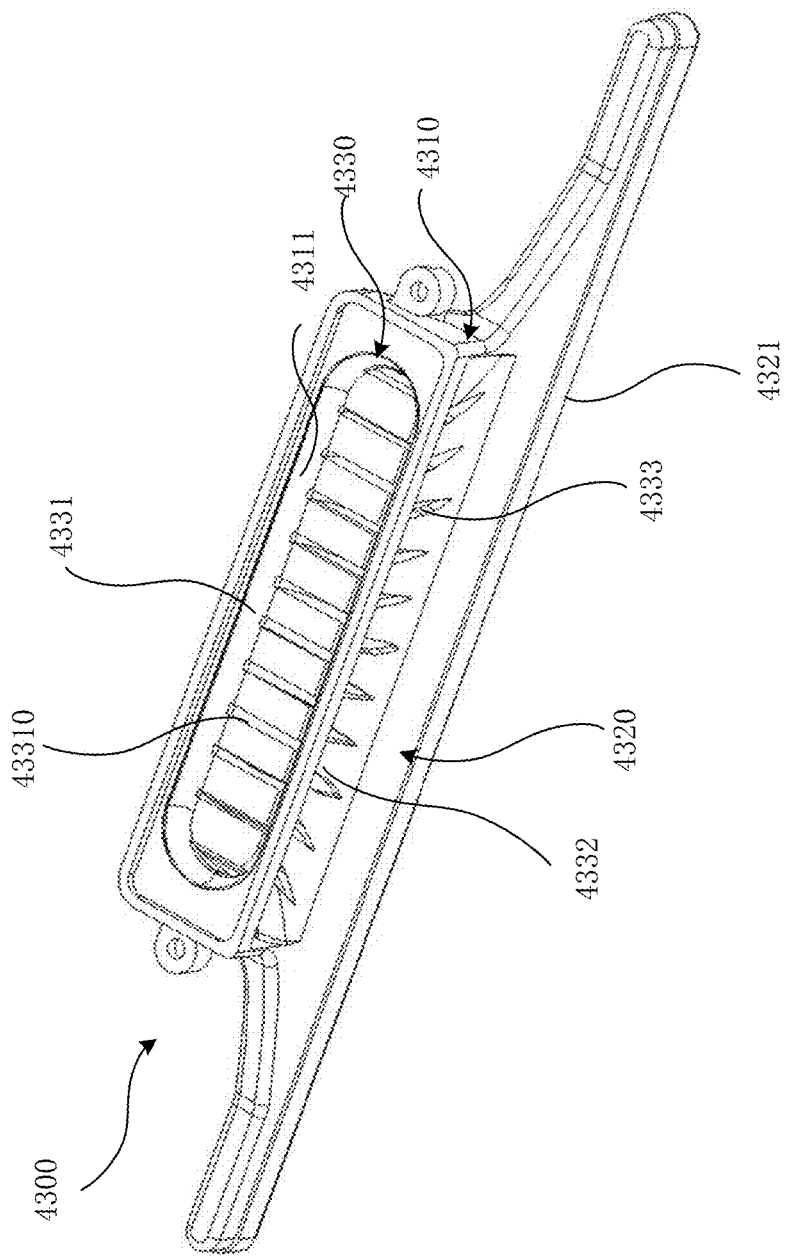
FIG. 12 is a schematic structure diagram of a sound guide device provided by another embodiment of the present disclosure.

FIG. 8 is a schematic structure diagram of a sound box in an electronic apparatus provided by another embodiment of the present disclosure. FIG. 9 is a schematic structure diagram of a sound guide assembly from a first perspective provided by another embodiment of the present disclosure. FIG. 10 is a schematic structure diagram of a sound guide assembly from the second perspective provided by another embodiment of the present disclosure. FIG. 11 is a schematic diagram of an internal structure of a sound guide assembly provided by another embodiment of the present disclosure. FIG. 12 is a schematic structure diagram of a sound guide device provided by another embodiment of the present disclosure.

As shown in FIG. 8, another embodiment of the present disclosure provides an electronic apparatus 4000, including a housing. The lower end of the housing is provided with an accommodating cavity 4100. A sound guide assembly is provided in the accommodating cavity 4100. The sound guide assembly includes a sound box 4200 and a sound guide device 4300. The sound receiving device 4300 shown in FIG. 8 is L-shaped. The sound guide device 4300 includes a sound input portion 4310 and a sound output portion 4320. The sound input portion 4310 is in communication with the sound output portion 4320. A sound inlet 4311 of the sound input portion 4310 and a sound outlet 4321 of sound output portion 4320 are arranged side by side, and a height at the sound inlet 4311 of the sound input portion 4310 is greater than that at the sound outlet 4321 of the sound output portion 4320.

Optionally, as shown in FIGS. 8 to 12, the electronic apparatus 4000 may include a backlight module 4500 arranged in the housing and a display 4600 arranged on the surface of the housing. The backlight module 4500 is arranged at an end of the housing close to the display 4600. An accommodating cavity 4100 is formed between the backlight module 4500 and the other end of the housing. The accommodating cavity 4100 is provided with a sound box bracket 4400 and a sound box 4200. The sound box 4200 is arranged on a side of the accommodating cavity 4100 close to the lower side frame 4700 of the housing, and the sound box 4200 is fixedly arranged on the sound box bracket 4400. Optionally, the sound box 4200 can be fixed by an approach of bolt connection or clamping connection in a hoisting manner.

The sound box 4200 may specifically include a sound box housing 4210 and a loudspeaker 4220 arranged at the lower portion of the sound box housing 4210. The sound inlet of the sound guide device 4300 is connected with the loudspeaker 4222, so as to lead out the sound emitted by the loudspeaker 4222.

The sound guide device 4300 is bent in an L-shape, and the angle between the upper surface of the sound input portion 4310 and the upper surface of the sound output portion 4320 is greater than or equal to ninety degrees. That is, from the perspective shown in FIG. 8, the sound input portion 4310 and the sound output portion 4320 are connected to form a substantially L-shape. That is, the height of the sound guide device 4300 is gradually decreased along the thickness direction of the electronic apparatus to form an L-shape. Alternatively, the height of the sound guide device 4300 is step-shaped somewhere in the middle to form a L-shape; for example, the junction between the sound input portion 4310 and the sound output portion 4320 is step-shaped. The sound guide device 4300 includes a sound input portion 4310 for sound lead-in and a sound output portion 4320 for sound lead-out. Thereinto, the sound input portion 4310 is located on the right side of the sound guide device 4300 in the plane shown in the figure, the sound output portion 4320 is located on the left side of the sound guide device 4300 in the plane shown in the figure, and the sound input portion 4310 and the sound output portion 4320 are in communication, so as to realize the sound propagation.

In this embodiment, the sound inlet 4311 of the sound input portion 4310 is parallel to the sound outlet 4321 of the sound output portion 4320, so as to ensure the horizontal propagation of the sound. At the same time, the height of the sound input portion 4310 at the sound inlet 4311 is greater than that of the sound output portion 4320 at the sound outlet 4311, so that the sound output portion occupies a lower height at the sound outlet 4321, which allows the sound outlet 4321 to be arranged on the front of the side frame, which is on the same side with the display surface, thereby ensuring better sound quality. At the same time, since the vertical space is very small, it is also possible to fully meet the design requirements of narrow frames, so that under the premise that the display region of the electronic apparatus is not affected, the overall space of the electronic apparatus is smaller and facilitates installation and use by the user. The sound inlet 4311 of the sound input portion 4310 is parallel to the sound outlet 4321 of the sound output portion 4320, and the height of the sound input portion 4310 at the sound inlet 4311 is greater than that of the sound output portion 4320 at the sound outlet 4321, which is mainly for the following purposes—there is a large drop in the height direction while ensuring that the sound remains constant during propagation in the horizontal direction, which makes it convenient to make the outlet of the loudspeaker 4222 into a long-strip micro slits on the front of the electronic apparatus. In this embodiment, the sound inlet 4311 of the sound input portion 4310 and the sound outlet 4321 of the sound output portion 4320 are parallel to each other. This specifically refers to that the sound inlet 4311 of the sound input portion 4310 and the sound outlet 4321 of the sound output portion 4320 are arranged side by side. When specifically realized through engineering, the sound inlet 4311 of the sound input portion 4310 and the sound outlet 4321 of the sound output portion 4320 can be arranged in parallel, or the sound inlet 4311 of the sound input portion 4310 and the sound outlet 4321 of the sound output portion 4320 can be slightly inclined, as long as it does not affect the sound propagation in the horizontal direction.

When the layout of the sound guide device 4300 of the electronic apparatus provided in this embodiment is adopted, the sound box 4200 can be arranged in the space enclosed by the rear side of the display screen and the housing, or in the space at the bottom portion of the display screen close to the rear housing. These positions have a relatively large space that is not occupied by other components, and will not increase the overall volume of the electronic apparatus. Moreover, the sound guide device 4300 of this embodiment is used to transmit the sound of the sound box 4200 to the front where the display surface is located, which ensures the sound quality effect, and overcomes the difficult problems of simultaneously balancing layout, sound quality and narrow frame design. The specific height of the front side frame of the electronic apparatus is limited by the height of the sound outlet 4321. Preferably, the electronic apparatus using the sound guide device 4300 of this embodiment can cause the height of the side frame be 1.5 to 5 mm while ensuring volume and quality of the front sound, there by achieving a visually ultra-thin frame.

With the solution of this embodiment, the sound guide device 4300 can also enhance the sound waves emitted by the sound box 2200, thereby increasing the propagation distance of the sound waves.

The sound guide device 4300 in this embodiment will be described in further detail hereinafter.

The height of the sound guide device 4300 is decreased along the direction from the sound inlet 4311 of the sound input portion 4310 towards the sound outlet 4321 of the sound output portion 4320.

Optionally, in the above-mentioned embodiment, the height of the sound input portion 4310 is decreased along the direction from the sound inlet 4311 of the sound input portion 4310 towards the sound outlet 4321 of the sound output portion 4320.

Through the above settings, the sound can be gradually gathered in the sound guide device 4300 to achieve the effect of enhancing the sound effect. At the same time, since the height of the sound guide device 4300 is gradually decreased, the sound is first compressed to concentrate and gather the sound capabilities. Meanwhile, the inner surface of the sound guide device 4300 can achieve a smooth transition and avoid dead corners, thereby helping to reduce the volume loss during propagation.

In this embodiment, the sound output portion 4320 is flat, which is beneficial to enhance the sound effect.

Optionally, as shown in FIG. 8, the above-mentioned flat shape indicates that the overall thickness of the sound output portion 4320 is smaller than that of the sound input portion 4310. For example, the thickness of the sound output portion 4320 can remain constant along the direction from the sound inlet 4311 of the sound input portion 4310 towards the sound outlet 4321 of the sound output portion 4320. Thus, this arrangement facilitates transmission of sound and facilitates processing of corresponding structures on the electronic apparatus.

The sound output portion 4320 in this embodiment may be specifically in a shape of a flat horn, which facilitates the diffusion of sound and enhances the sound effect. The sound output portion 4320 is in the shape of a flat horn, and the flat horn forms a tapered sound guide, which compresses the gathered sound, and then amplifies the sound through the flat horn-shaped sound output portion 4320, so as to improve the directivity of the sound while improving the sound effect.

The sound guide device 4300 is further provided with an equalizer 4330. The equalizer sound inlet 4331 of the equalizer 4330 is in communication with the sound inlet 4311 of the sound input portion 4310, and the equalizer sound outlet 4332 is in communication with the sound outlet 4321 of the sound output portion 4320. Through the equalizer 4330, the sound entering the sound guide device 4300 can be evenly distributed to the sound guide device 4300.

Optionally, the equalizer sound inlet 4331 includes at least two sound input holes 43310 arranged at intervals. The sound input hole 43310 is in communication with the sound inlet 4311 of the sound input portion 4310, and a first sound guide channel is formed between the sound input hole 43310 and the equalizer sound outlet 4332. The sound entering the equalizer 4330 passes through different first sound guide channels and is evenly transmitted to the inside of the sound guide device 4300.

Optionally, the sound input hole 43310 is a sound inlet slit arranged vertically. This can better balance the sound at various frequencies while preliminarily compressing the sound.

In this embodiment, the equalizer 4330 includes at least two sound guide structures 4333. The sound input hole 43310 and the first sound guide channel are formed between adjacent sound guide structures 4333.

Optionally, the sound guide structure 4333 includes a first plate member 43331 and inclined partitions 43332 respectively arranged on both sides of the first plate member 43331. The first plate member 43331 and the inclined partitions 43332 respectively arranged on both sides of the first plate member 43331 form a triangular shape.

The first plate member 43331 and the inclined partitions 43332 respectively arranged on both sides of the first plate member 43331 surround and form a hollow triangular column with a die hole 4334. Arrangement of the die hole 4334 can facilitate processing and improve the processing efficiency.

Optionally, the equalizer sound input hole 43310 is formed between the adjacent first plate members 43331. The equalizer sound outlet 4332 is formed between the angles of the adjacent inclined partitions 43332. The angle between the two inclined partitions 43332 is an acute angle, so that the width of the equalizer sound inlet 4331 is smaller than that of the equalizer sound outlet 4332. The sound preliminarily compressed by the sound input hole 43310 will be further compressed before entering the first half of the first sound guide channel. Meanwhile, since the width of the equalizer sound inlet 4331 is smaller than that of the equalizer sound outlet 4332, it can be seen that the outlet of the first sound guide channel is larger than the inlet, so that the entire first sound guide channel is also horn-shaped, and the compressed sound has a preliminary sound amplification effect after being transmitted in the first channel. Then, it enters into the flat horn-shaped sound output portion 4320 to amplify the sound again, so that the sound effect and sound directivity are further enhanced.

In this embodiment, the sound input hole 43310 and the equalizer sound outlet 4332 may be perpendicular to each other, so that the sound compression effect is enhanced.

The height of the lower surface at the equalizer sound inlet 4331 is greater than that of the lower surface of the sound output portion 4320 at the sound outlet 4321, which increases the height difference between the equalizer sound inlet 4331 and the sound outlet 4321 of the sound output portion 4320 and facilitates reducing the thickness of the sound output part 4320.

Through the above arrangement, the sound wave gradually propagates from a narrower space to a wider space in the equalizer, thereby increasing the propagation range of the sound wave.

In the description of the embodiments of the present disclosure, it should be understood that the terms indicating orientation or positional relationship, such as "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axis," "radial," and "circumferential" are based on the orientation or positional relationship shown in the drawings, and is only for the convenience of describing the embodiments of the present disclosure and simplifying the description, rather than indicating or implying that the device or element must have a specific orientation, or be constructed and operated in a specific orientation; thus it cannot be understood as a limitation on the embodiments of the present disclosure.

In the description of the present disclosure, unless expressly stipulated and limited otherwise, the terms "install," "in connection," "connect," and "fix" shall be interpreted broadly; for example, they may be fixedly connected, detachably connected, or integrated; they may be directly connected or indirectly connected through an intermediate medium, and may be an internal communication between two components or an interaction relationship between two components. For those skilled in the art, the specific meaning of the above-mentioned terms in the present disclosure can be understood according to specific circumstances.

It should be noted that in the description of the embodiments of the present disclosure, the terms "first" and "second" are only used to facilitate the description of different components, and cannot be understood as indicating or implying a sequence relationship, relative importance, or implicitly indicating the number of technical features indicated. Therefore, the features defined with "first" and "second" may explicitly or implicitly include at least one of the features.

Finally, it should be noted that the above embodiments are only used to illustrate the technical solutions of the embodiments of the present disclosure, not to limit them. Although the embodiments of the present disclosure are described in detail with reference to the above-mentioned embodiments, those skilled in the art should understand that it is still possible to modify the technical solutions described in the above-mentioned embodiments, or equivalently replace some or all of the technical features, and that these modifications or replacements do not cause the essence of the corresponding technical solutions to deviate from the scope of technical solutions of the embodiments of the present disclosure.

INDUSTRIAL APPLICABILITY

The electronic apparatus provided by the embodiment of the present disclosure includes a housing. One end of the housing is provided with an accommodating cavity. A sound guide assembly is provided in the accommodating cavity. The sound guide assembly includes a sound box and a sound guide device. The sound guide device includes a sound receiving portion and a sound guide body. The sound receiving portion is connected with the sound box. The sound guide body is a sound guide body leading out a sound. An end surface of the sound receiving portion is provided with a sound inlet. A tail end of the sound guide body deviating from the sound receiving portion is provided with a sound outlet. A bottom portion of the sound guide body is located on an installation datum plane. The sound receiving portion and the sound guide body are located on a same side of the installation datum plane. A bottom portion of the sound receiving portion is located on the installation datum plane or separated from the installation datum plane at a preset distance. A vertical height of the tail end of the sound guide body is smaller than that of the sound receiving portion. With the above arrangement, when the electronic apparatus of the present disclosure is in use, since the vertical height of the tail end of the sound guide body is smaller than that of the sound receiving portion, the side frame on a side of the sound outlet of the electronic apparatus can be made thin to achieve a narrow frame.

What is claimed is:

1. An electronic apparatus, comprising:
   a housing,
   wherein one end of the housing comprises an accommodating cavity, a sound guide assembly is provided in the accommodating cavity, the sound guide assembly comprises a sound box and a sound guide device, the sound guide device comprises a sound receiving portion and a sound guide body, the sound receiving portion is connected with the sound box, and the sound guide body is configured to lead out a sound;
   wherein an end surface of the sound receiving portion comprises a sound inlet, and a tail end of the sound guide body deviating from the sound receiving portion comprises a sound outlet;
   wherein a bottom portion of the sound guide body is located on an installation datum plane, the sound receiving portion and the sound guide body are located on a same side of the installation datum plane, and a bottom portion of the sound receiving portion is located on the installation datum plane or separated from the installation datum plane at a preset distance; and
   wherein a vertical height of the tail end of the sound guide body is smaller than that of the sound receiving portion.

2. The electronic apparatus according to claim 1, wherein a projection width of the sound inlet on the installation datum plane is smaller than that of the sound outlet on the installation datum plane.

3. The electronic apparatus according to claim 2, wherein the sound guide body comprises a first part and a second part that are connected with each other, the first part is connected with the sound receiving portion, and the sound outlet is provided on a side of the second part deviating from the first part.

4. The electronic apparatus according to claim 3, wherein the vertical height of the first part on the installation datum plane gradually decreases from the sound inlet to the sound outlet, and the vertical height of the first part on the installation datum plane is greater than or equal to that of the second part on the installation datum plane.

5. The electronic apparatus according to claim 4, wherein a projection width of a place where the first part is connected with the sound receiving portion on the installation datum plane is greater than that of a place where the first part is connected with the second part on the installation datum plane, and a projection width of the first part on the installation datum plane is smaller than that of the second part on the installation datum plane.

6. The electronic apparatus according to claim 5, wherein the vertical height of the second part is equal across the installation datum plane, and the projection width of the second part is equal across the installation datum plane.

7. The electronic apparatus according to claim 1, wherein the sound outlet further comprises shock absorbing foam and a loudspeaker mesh,
wherein the shock absorbing foam surrounds an outer side wall of the sound outlet, and the loudspeaker mesh is arranged at a tail end of the sound outlet.

8. The electronic apparatus according to claim 1, further comprising:
an equalizer,
wherein the equalizer comprises an equalizer sound inlet, the equalizer sound inlet is connected with the sound inlet, and the equalizer is configured to evenly transmit a sound emitted by the sound box.

9. The electronic apparatus according to claim 8, wherein the equalizer sound inlet comprises a plurality of sound guide plates, an interval between every two adjacent sound guide plates is equal, and a gap between the two adjacent sound guide plates forms a sound input hole of the equalizer.

10. The electronic apparatus according to claim 8, wherein the equalizer is further provided with a plurality of drawing holes.

11. An electronic apparatus, comprising:
a housing,
wherein one end of the housing comprises an accommodating cavity, a sound guide assembly is provided in the accommodating cavity, and the sound guide assembly comprises a sound box and a sound guide device;
wherein the sound guide device is L-shaped and comprises a sound input portion and a sound output portion, the sound input portion is connected with the sound box, the sound input portion is in communication with the sound output portion; and
wherein a sound inlet of the sound input portion and a sound outlet of the sound output portion are arranged side by side, and a height of the sound input portion at the sound inlet is greater than that of the sound output portion at the sound outlet.

12. The electronic apparatus according to claim 11, wherein a height of the sound guide device is decreased along a direction from the sound inlet of the sound input portion towards the sound outlet of the sound output portion.

13. The electronic apparatus according to claim 11, wherein a height of the sound input portion is decreased along a direction from the sound inlet of the sound input portion towards the sound outlet of the sound output portion.

14. The electronic apparatus according to claim 13, wherein a thickness of the sound output portion remains constant along a direction from the sound inlet of the sound input portion towards the sound outlet of the sound output portion.

15. The electronic apparatus according to claim 11, wherein the sound output portion is in a flat shape.

16. The electronic apparatus according to claim 15, wherein the equalizer sound inlet comprises at least two sound input holes arranged at intervals, at least one of the sound input holes is in communication with the sound inlet of the sound input portion, and a first sound guide channel is formed between the at least one of the sound input holes and the equalizer sound outlet.

17. The electronic apparatus according to claim 16, wherein the sound input hole is a sound input slit arranged vertically.

18. The electronic apparatus according to claim 16, wherein the equalizer comprises at least two sound guide structures, and the at least one of the sound input holes and the first sound guide channel are formed between adjacent sound guide structures.

19. The electronic apparatus according to claim 18, wherein at least one of the sound guide structures includes a first plate member and inclined partitions respectively arranged on both sides of the first plate member, and the first plate member and the inclined partitions respectively arranged on both sides of the first plate form a triangle shape.

20. The electronic apparatus according to claim 19, wherein the first plate member and the inclined partitions respectively arranged on both sides of the first plate member surround and form a hollow triangular column with a drawing hole.

21. The electronic apparatus according to claim 19, wherein an angle between the two inclined partitions is an acute angle.

22. The electronic apparatus according to claim 21, wherein the sound input hole of the equalizer is formed between adjacent first plate members,
wherein the equalizer sound outlet is formed between an angle of the adjacent inclined partitions, and
wherein a width of the sound input hole is smaller than that of the equalizer sound outlet.

23. The electronic apparatus according to claim 15, wherein a height of a lower surface of the equalizer sound inlet is greater than that of a lower surface of the sound outlet of the sound output portion.

24. The electronic apparatus according to claim 16, wherein at least one of the sound input holes and the equalizer sound outlet are perpendicular to each other.

25. The electronic apparatus according to claim 11, wherein the sound output portion is in a shape of a flat horn.

26. The electronic apparatus according to claim 11, wherein an angle between an upper surface of the sound input portion and an upper surface of the sound output portion is greater than or equal to ninety degrees.

27. The electronic apparatus according to claim 11, wherein the sound guide device further comprises an equalizer, and
wherein the equalizer comprises an equalizer sound inlet, the equalizer sound inlet is in communication with the sound inlet of the sound input portion, and an equalizer sound outlet is in communication with the sound outlet of the sound output portion.

28. The electronic apparatus according to claim 11, wherein the sound inlet of the sound input portion is parallel to the sound outlet of the sound output portion.

* * * * *